UNITED STATES PATENT OFFICE.

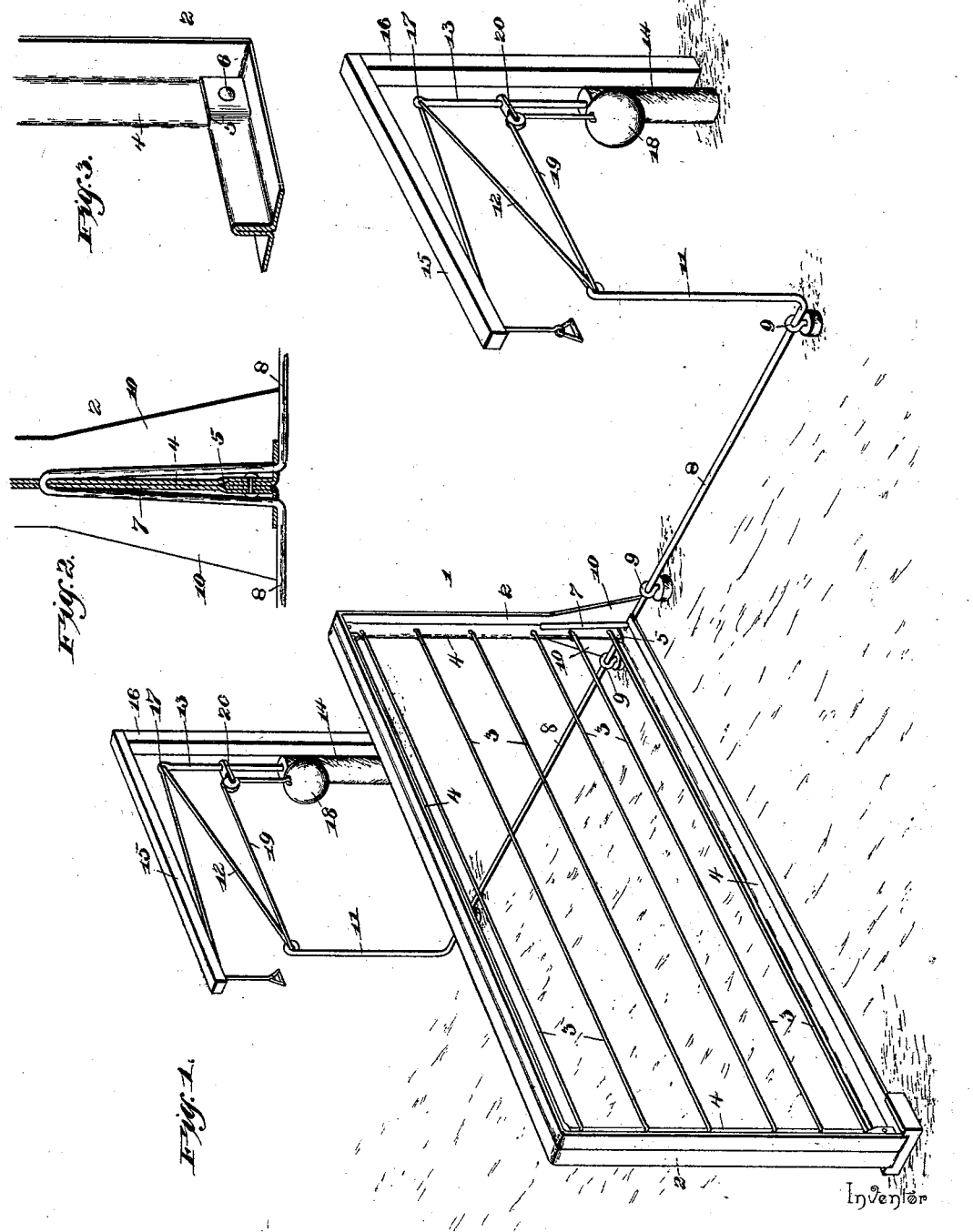

BENJAMIN F. CANODE, OF MOUNT MORRIS, ILLINOIS.

GATE.

SPECIFICATION forming part of Letters Patent No. 543,957, dated August 6, 1895.

Application filed September 29, 1894. Serial No. 524,496. (No model.)

*To all whom it may concern:*

Be it known that I, BENJAMIN F. CANODE, a citizen of the United States, residing at Mount Morris, in the county of Ogle and State of Illinois, have invented a new and useful Gate, of which the following is a specification.

The invention relates to improvements in gates.

The object of the present invention is to improve the construction of tilting gates and to provide a simple and inexpensive one, which may be readily operated at a distance from either side of it to avoid dismounting or leaving a vehicle.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention. Fig. 2 is a detail sectional view of the same, illustrating the manner of connecting the gate with the rock-shaft. Fig. 3 is a detail perspective view of a portion of the frame of the gate, illustrating the construction at one corner thereof.

Like numerals of reference indicate like parts in all the figures of the drawings.

1 designates a gate consisting of a rectangular frame 2 and a series of vertical, diagonal, or horizontal fence-wires 3, which are secured to flanges or ribs 4 of the gate. The rectangular frame of the gate is constructed of a continuous T-shaped bar or angle-iron, preferably formed of sheet metal bent into the T-shaped form shown. At each corner the continuous T-shaped bar is bent at right angles. The rib or flange 4 is cut transversely and one of the ends of the same is split, as at 5, to receive the other end, and a fastening device 6 is passed through the severed ends of the rib or flange, whereby the bar is secured when bent at an angle.

The gate is connected at its lower inner corner to a crank-bend 7 of a longitudinally-disposed rock-shaft 8, which extends along the roadway, at one side thereof, and is journaled in suitable bearings 9. The inner end of the gate is widened at the bottom, and the wings 10 formed thereby serve to strengthen it. The terminals of the longitudinally-disposed rock-shaft are extended upward to form arms 11, and connected to the latter are operating-ropes 12, which extend from the said arms to upward-extending resilient rods or springs 13 of posts 14 and depend from horizontal arms 15 of supports 16 in convenient position to be grasped by a person on horseback or from within a vehicle. The resilient rods or springs 13 of the posts 14 are provided at their upper ends with eyes 17 or the like, and it will be readily apparent that when either one of the operating-ropes is pulled the tilting gate will be swung upward to a vertical position for opening the same, and after passing through the gate the other operating-rope is pulled upon for closing the gate.

The opening and closing of the gate is assisted by weights 18, which serve to counterbalance the gate and which are attached to the ends of short ropes 19, extending through eyes 20 or the like of the springs 13 and connected to the upper terminals of the arms 11 of the rock-shaft. This construction renders the gate very easy to open and close and makes necessary only a slight pull on the operating-ropes to open or close the gate.

It will be seen that the tilting gate is simple and comparatively inexpensive in construction; that it is positive and reliable in its operation, and that it may be readily opened and closed by a slight pull without dismounting or leaving a vehicle.

Changes in the form, proportion, and the minor details of construction may be resorted to without departing from the principle or sacrificing any of the advantages of this invention.

What I claim is—

1. The combination of a tilting gate, a longitudinally-disposed rock-shaft extending from the gate in opposite directions and connected with the lower inner corner of the same and provided at its terminals with upward-extending arms, posts located adjacent to the ends of the rock-shaft and provided with upward-extending springs, and operating ropes loosely mounted on the springs and connected with the arms of the rock-shaft, substantially as described.

2. The combination of a tilting gate, a longitudinally-disposed rock-shaft extending from the gate in opposite directions and connected with the lower inner corner of the same and provided at its terminals with upward-extending arms, posts located adjacent to the ends of the rock-shaft and provided with upward-extending springs, the operating ropes 12 loosely mounted on the springs and connected with the arms of the rock-shaft, and the ropes 19 provided with counterbalancing weights and attached to the arms of the rock-shaft and loosely connected with the posts and supported by the same, substantially as described.

3. The combination of a tilting gate, a longitudinally-disposed rock-shaft provided at its ends with arms and having a central crank-bend connected with the gate at the lower inner corner thereof, operating ropes connected with the arms of the rock-shaft, and counterbalancing ropes connected with the said arms, substantially as described.

In testimony that I claim the foregoing as my own I have hereto affixed my signature in the presence of two witnesses.

BENJAMIN F. CANODE.

Witnesses:
W. W. HANES,
J. L. RICE.